(12) United States Patent
Greer et al.

(10) Patent No.: US 11,330,060 B2
(45) Date of Patent: May 10, 2022

(54) SYSTEM INCLUDING A ROUTER, CONTROLLERS AND NON-LIGHT-EMITTING VARIABLE TRANSMISSION DEVICES AND A METHOD OF USING THE SAME

(71) Applicant: SAGE ELECTROCHROMICS, INC., Faribault, MN (US)

(72) Inventors: Bryan D. Greer, Northfield, MN (US); Troy Liebl, Owatonna, MN (US); David Buszmann, New Market, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 606 days.

(21) Appl. No.: 16/127,777

(22) Filed: Sep. 11, 2018

(65) Prior Publication Data
US 2019/0098092 A1   Mar. 28, 2019

Related U.S. Application Data (60) Provisional application No. 62/561,990, filed on Sep. 22, 2017.

(51) Int. Cl.
*H04L 29/08* (2006.01)
*G06F 1/32* (2019.01)
(Continued)

(52) U.S. Cl.
CPC .......... *H04L 67/125* (2013.01); *G02F 1/163* (2013.01); *G06F 1/189* (2013.01); *G06F 1/28* (2013.01);
(Continued)

(58) Field of Classification Search
CPC .............................. H04L 67/125; G02F 1/163
(Continued)

(56) References Cited

U.S. PATENT DOCUMENTS

| 6,567,708 B1 | 5/2003 | Bechtel et al. |
| 8,213,074 B1 | 7/2012 | Shrivastava et al. |

(Continued)

FOREIGN PATENT DOCUMENTS

| CN | 106575064 A | 4/2017 |
| CN | 107109892 A | 8/2017 |

(Continued)

OTHER PUBLICATIONS

"Connected Lighting," Philips Lighting, 2016, 8 pgs.
International Search Report and Written Opinion for PCT/US2018/050399, dated Dec. 28, 2018, 15 pages.

*Primary Examiner* — Robert A Cassity
(74) *Attorney, Agent, or Firm* — Abel Schillinger, LLP; Robert N Young (57) ABSTRACT

A system can include a non-light-emitting, variable transmission device a controller coupled and configured to provide power to the first non-light-emitting, variable transmission device; and a router configured to provide power and control signals to the first controller. In an aspect, the controller includes a first connector; the router includes a second connector; and a cable including a third connector and a fourth connector at different ends of the cable. The first and third connectors are coupled to each other, and the second and fourth connectors are coupled to each other. In another aspect, the system can include other non-light-emitting, variable transmission devices and controllers. The system can be configured to perform a method of controlling the system that includes determining power requirements for (Continued)

the controllers and allocating power to the controllers corresponding to the power requirements.

15 Claims, 4 Drawing Sheets

(51) Int. Cl.
| | |
|---|---|
| G06F 1/28 | (2006.01) |
| H04L 67/125 | (2022.01) |
| H04L 12/403 | (2006.01) |
| G06F 1/3234 | (2019.01) |
| G06F 1/3209 | (2019.01) |
| G06F 1/18 | (2006.01) |
| H04L 12/28 | (2006.01) |
| G02F 1/163 | (2006.01) |
| E06B 9/24 | (2006.01) |

(52) U.S. Cl.
CPC .......... *G06F 1/3209* (2013.01); *G06F 1/3278* (2013.01); *H04L 12/2816* (2013.01); *H04L 12/403* (2013.01); *E06B 2009/2464* (2013.01)

(58) Field of Classification Search
USPC ........................................ 713/300
See application file for complete search history.

(56) References Cited

U.S. PATENT DOCUMENTS

| | | | | |
|---|---|---|---|---|
| 2007/0208961 | A1* | 9/2007 | Ghoshal | G06F 1/189 |
| | | | | 713/300 |
| 2009/0031152 | A1* | 1/2009 | Bolderl-Ermel | ............................ |
| | | | | H04L 12/40045 |
| | | | | 713/300 |
| 2010/0228854 | A1 | 9/2010 | Morrison et al. | |
| 2010/0262850 | A1* | 10/2010 | Lin | H04L 43/0817 |
| | | | | 713/320 |
| 2012/0176735 | A1 | 7/2012 | Davis | |
| 2012/0239209 | A1 | 9/2012 | Brown et al. | |
| 2013/0064360 | A1 | 3/2013 | Albiston et al. | |
| 2013/0151025 | A1* | 6/2013 | Wendt | H05B 47/18 |
| | | | | 700/295 |
| 2013/0271813 | A1 | 10/2013 | Brown | |
| 2014/0236323 | A1 | 8/2014 | Brown et al. | |
| 2014/0368899 | A1 | 12/2014 | Greer | |
| 2015/0106536 | A1* | 4/2015 | Lauby | H04L 12/10 |
| | | | | 710/8 |
| 2016/0062432 | A1* | 3/2016 | Faraz | H04L 12/10 |
| | | | | 713/300 |
| 2016/0094350 | A1* | 3/2016 | Picard | G06F 1/3206 |
| | | | | 713/300 |
| 2016/0183351 | A1 | 6/2016 | Snyder et al. | |
| 2017/0060228 | A1 | 3/2017 | Lehr et al. | |
| 2017/0212400 | A1 | 7/2017 | Shrivastava et al. | |
| 2019/0081805 | A1* | 3/2019 | Frezza | H04L 12/10 |

FOREIGN PATENT DOCUMENTS

| | | |
|---|---|---|
| WO | 2016086017 A1 | 6/2016 |
| WO | 2017007841 A1 | 1/2017 |
| WO | 2017151314 A1 | 9/2017 |

* cited by examiner

SYSTEM INCLUDING A ROUTER, CONTROLLERS AND NON-LIGHT-EMITTING VARIABLE TRANSMISSION DEVICES AND A METHOD OF USING THE SAME

CROSS-REFERENCE TO RELATED APPLICATION

This application claims priority under 35 U.S.C. § 119(e) to U.S. Provisional Application No. 62/561,990, entitled "SYSTEM INCLUDING A ROUTER, CONTROLLERS AND NON-LIGHT-EMITTING VARIABLE TRANSMISSION DEVICES AND A METHOD OF USING THE SAME," by Bryan D. Greer et al., filed Sep. 22, 2017, which is assigned to the current assignee hereof and is incorporated herein by reference in its entirety.

FIELD OF THE DISCLOSURE

The present disclosure is directed to systems that include non-light-emitting variable transmission devices, and more specifically to systems including routers, controllers and non-light-emitting variable transmission devices and methods of using the same.

BACKGROUND

A non-light-emitting variable transmission device can reduce glare and the amount of sunlight entering a room. Buildings can include many non-light-emitting variable transmission devices that may be controlled locally (at each individual or a relatively small set of devices), for a room, or for a building (a relatively large set of devices). Wiring the devices can be very time consuming and complicated, particularly as the number of devices being controlled increases. Connecting the devices to their corresponding control system can be performed on a wire-by-wire basis using electrical connectors or connecting techniques, such as terminal strips, splicing, soldering, wire nuts, or the like. Tracking down wiring issues can be difficult, particularly, as the number of devices increase and the length of the wiring becomes longer. Replacement of control equipment can become a very difficult task.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The terms "normal operation" and "normal operating state" refer to conditions under which an electrical component or device is designed to operate. The conditions may be obtained from a data sheet or other information regarding voltages, currents, capacitances, resistances, or other electrical parameters. Thus, normal operation does not include operating an electrical component or device well beyond its design limits.

The term "power requirement", when referring to an electrical device coupled to one or more downstream electrical devices is intended to refer to the maximum power that such downstream electrical devices use during normal operation of such downstream devices and any power consumed by connections and wiring between the electronic device and the downstream electronic devices. As an example, a controller may be coupled to three non-light-emitting variable transmission devices that draw 10 W, 20 W, and 25 W of power. The power requirement of the non-light-emitting variable transmission devices with respect to the controller is the sum of the powers, or 55 W.

The term "power rating", when referring to an electrical device, is intended to refer to the maximum power that such electrical device uses during normal operation of such device. As an example, a router that uses up to 500 W during normal operation has a power rating of 500 W, and a controller that uses up to 80 W during normal operation has a power rating of 80 W. Power rating may be obtained from data sheet or other specifications for the device.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

A system can include a non-light-emitting, variable transmission device; a controller coupled and configured to provide power to the non-light-emitting, variable transmission device; and a router configured to provide power and control signals to the controller. In an aspect, the controller includes a first connector, the router includes a second connector; and a cable includes a third connector and a connector at different ends of the cable, wherein the first and third connectors are coupled to each other, and the second and fourth connectors are coupled to each other. The use of male/female connections can help with quick and easy replacement of, adding, or removing a component within the system. A controller or router may be replaced without any tools. A comparative system may require a screwdriver, a solder gun, electrical tape or the like. Further, the male/female connections save significantly on the time need to change the configuration. Individual wires do not need to be traced for the entire signal path between components. The likelihood of incorrect wiring is significantly reduced.

In another aspect, the system can be configured to perform a method of controlling the system. The system can include other non-light-emitting, variable transmission devices and other controllers. The method can include determining power requirements for the controllers and allocating power to the controllers corresponding to the power requirements. The system can be configured to allocate of power to controllers can be part of any initial commissioning of the system or any subsequent re-commissioning. The system allows all non-light-emitting, variable transmission devices coupled to a router to receive full power at the same time.

The systems and methods are better understood after reading the specification in conjunction with the figures. System architectures are described and illustrated, followed by an exemplary construction of a non-light-emitting, variable transmission device, and a method of controlling the system. The embodiments described are illustrative and not meant to limit the scope of the present invention, as defined by the appended claims.

Figure 1:
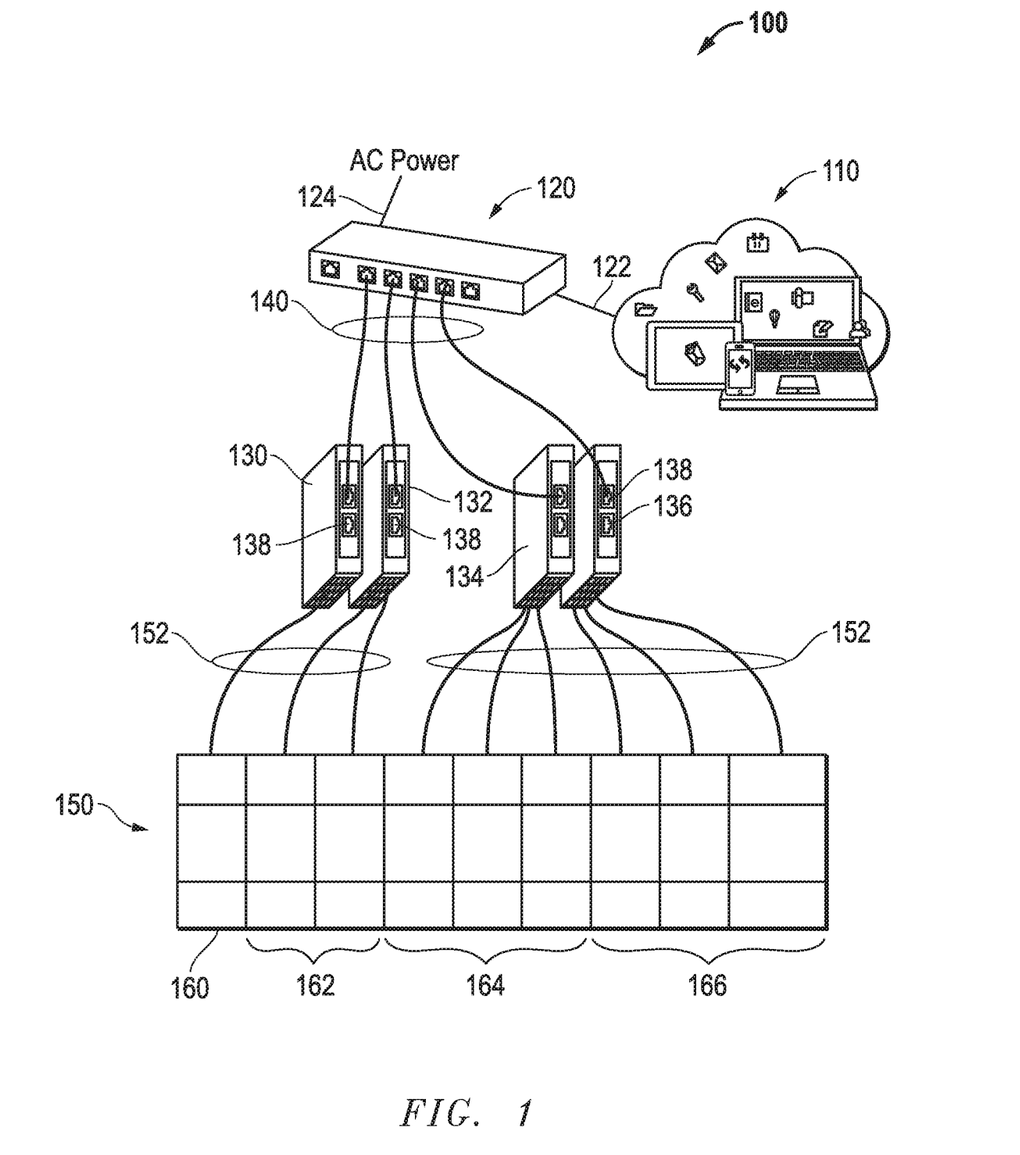
FIG. 1 includes a schematic depiction of a system for controlling a set of non-light-emitting, variable transmission devices in accordance with an embodiment.

Referring to FIG. 1, a system for controlling a set of non-light-emitting, variable transmission devices is illustrated and is generally designated 100. As depicted, the system 100 can include a building management system 110. In a particular aspect, the building management system 110 can include a computing device such as a desk top computer, a laptop computer, a tablet computer, a smartphone, some other computing device, or a combination thereof. The building management system 110 can be used to control the heating ventilation air condition (HVAC) system of the building, interior lighting, exterior lighting, emergency lighting, fire suppression equipment, elevators, escalators, alarms, security cameras, access doors, another suitable component or sub-system of the building, or any combination thereof.

As illustrated in FIG. 1, the system 100 can include a router 120 connected to the building management system 110 via a control link 122. The control link 122 can be a wired connection or a wireless connection. For example, the wired connection can include a cable such as a Category 3 cable, a Category 5 cable, a Category 5e cable, a Category 6 cable or another suitable cable that can be used in the transmission of control signals or a combination of power and control signals. In an embodiment, wired connections can comply with the IEEE 802.3 (Ethernet) family of standards. In another embodiment, the control link 122 can use a wireless local area network connection operating according to one or more of the standards within the IEEE 802.11 (WiFi) family of standards. In a particular aspect, the wireless connections can operate within the 2.4 GHz ISM radio band, within the 5.0 GHz ISM radio band, or a combination thereof.

Regardless of the type of control link 122, the building management system 110 can provide control signals to the router 120 via the control link 122. The control signals can be used to control the operation of one or more non-light-emitting variable transmission devices that are indirectly, or directly, connected to the router 120 and described in detail below. As indicated in FIG. 1, the router 120 can be connected to an alternating current (AC) power source 124. The router 120 can include an onboard AC-to-direct current (DC) converter (not illustrated). The onboard AC-to-DC converter can convert the incoming AC power from the AC power source 124, approximately 120 Volts (V) AC, to a DC voltage that is at most 60 VDC, 54 VDC, 48 VDC, 24 VDC, at most 12 VDC, at most 6 VDC, or at most 3 VDC.

FIG. 1 also indicates that the router 120 can include a plurality of connectors that can be in the form of female connectors 126. In a particular aspect, the female connectors 126 can include one or more RJ-11 jacks, one or more RJ-14 jacks, one or more RJ-25 jacks, one or more RJ-45 jacks, one or more 8P8C jacks, another suitable jack, or a combination thereof. In another aspect, the female connectors 126 can include one or more universal serial bus (USB) jacks. In a particular embodiment, the female connectors 126 can be USB-C connectors.

As further illustrated in FIG. 1, the system 100 can include controllers 130, 132, 134, and 136 connected to the router 120. The router 120 can be configured to provide power and control signals to the controllers 130, 132, 134, and 136. In a particular aspect, the router 120 can include a power inlet port and a control signal port. The router 120 can be configured to receive power via and power inlet port 124 and provide power to any or all of the controllers 130, 132, 134, and 136 and receive control signals via a control link and provide control signals to any or all of the controllers 130, 132, 134, and 136. The onboard AC-to-DC converter within the router 120 can be coupled to the power input port of the router 120. The router 120 can further include a component that is configured to reduce a voltage of power received over the power input port to voltages of power transmitted over the controller port. The component can include a transformer or a voltage regulator.

Each of the controllers 130, 132, 134, and 136 can include a plurality of connectors in the form of female connectors 138. The female connectors 138 on the controllers 130, 132, 134, and 136 can include one or more RJ-11 jacks, one or more RJ-14 jacks, one or more RJ-25 jacks, one or more RJ-45 jacks, one or more 8P8C jacks, another suitable jack, or a combination thereof. In another aspect, the female connectors 138 can include one or more USB jacks. In a particular embodiment, the female connectors 138 can be USB-C connectors. In still another aspect, the female connectors on the controllers 130, 132, 134, and 136 can be substantially identical to the female connectors 126 of the router 120.

As illustrated in FIG. 1, a plurality of cables 140 can used to connect the controllers 130, 132, 134, and 136 to the router 120. Each of the cables 140 can include a Category 3 cable, a Category 5 cable, a Category 5e cable, a Category 6 cable, or another suitable cable. In an embodiment, the plurality of cables 140 can include twisted pair conductors, such as twisted pair wires. In another embodiment, each cable 140 can be configured to transmit at least 4 W of power, and in another embodiment, each cable can be configured to transmit at most 200 W of power. In another embodiment, each cable 140 can be configured to support a data rate of at least 3 Mb/s, and in another embodiment, each cable can be configured to support a data rate of at most 100 Gb/s. Each of the cables 140 can include a male connector crimped on, or otherwise affixed to, the distal and proximal ends of each of the cables 140. In addition, each male connector can include an RJ-11 plug, an RJ-14 plug, an RJ-25 plug, an RJ-45 plug, an 8P8C plug, another suitable plug, or a combination thereof. In another aspect, the male connectors can include one or more USB plugs. In a particular embodiment, the male connectors can be USB-C connectors. In an embodiment, the male and female connectors at each connection can be complementary connectors. The male/female connections allow components, such as the controllers 130, 132, 134, and 136, to be quickly and easily disconnected from the system 100 and replaced. Further, the male/female connections can allow the router 120 to be easily disconnected from the system 100 and replaced. While the system 100 of FIG. 1 is illustrated with four controllers 130, 132, 134, and 136, the system 100 may include more or fewer controllers.

Still referring to FIG. 1, the system 100 can also include a window frame panel 150 electrically connected to the controllers 130, 132, 134, and 136 via a plurality of sets of frame cables 152. The window frame panel 150 can include a plurality of non-light-emitting, variable transmission devices, each of which may be connected to its corresponding controller via its own frame cable. In the embodiment as illustrated, the non-light-emitting, variable transmission devices are oriented in a 3×9 matrix. In another embodiment, a different number of non-light-emitting, variable transmission devices, a different matrix of the non-light-emitting, variable transmission devices, or both may be used. Each of the non-light-emitting, variable transmission devices may be on separate glazings. In another embodiment, a plurality of non-light-emitting, variable transmission devices can share a glazing. For example, a glazing may correspond to a column of non-light-emitting, variable transmission devices in FIG. 1. A glazing may correspond to a plurality of column of non-light-emitting, variable transmission devices. In another embodiment, a pair of glazings in the window frame panel 150 can have different sizes, such glazings can have a different numbers of non-light-emitting, variable transmission devices. After reading this specification, skilled artisans will be able to determine a particular number and organization of non-light-emitting, variable transmission devices for a particular application.

In a particular, non-limiting embodiment, the window frame panel 150 can include a set 160 of non-light-emitting, variable transmission devices coupled to the controller 130 via a set of frame cables 152. The window frame panel 150 can also include a set 162 of non-light-emitting, variable transmission devices connected to the controller 132 via sets of frame cables 152. Moreover, the window frame panel 150 can include a set 164 of non-light-emitting, variable transmission devices connected to the controller 134 via other sets frame cables 152, and a set 166 of non-light-emitting, variable transmission devices connected to the controller 136 via further sets frame cables 152. While the system 100 of FIG. 1 is illustrated with the sets 160, 162, 164, and 166, the system 100 may include more or fewer sets of non-light-emitting, variable transmission devices.

In an embodiment, any one or more of the frame cables 152 may have male or female connector on only one end of the cables or may have no male or female connector on either end of the cable. For example and referring to FIG. 4, the bus bars 344 and 348 may have wired connected at solder tabs. These wires may be connected to its corresponding controller without any male or female connector. Alternatively, the wires may be connected to a male or female connector. After reading this specification, skilled artisans will appreciate that not all connectors within the system need to be male or female connectors.

The controllers 130, 132, 134, and 136 can provide power to the sets 160, 162, 164, and 166 of non-light-emitting, variable transmission devices connected thereto via the sets of frame cables 152. The power provided to the sets 160, 162, 164, and 166 can have a voltage that is at most 12 V, at most 6 V, or at most 3 V. The controllers 130, 132, 134, and 136 can be used to control operation of the non-light-emitting, variable transmission devices within the sets 160, 162, 164, and 166. During operation, the non-light-emitting, variable transmission devices within the sets 160, 162, 164, and 166 act similar to capacitors. Thus, most of the power is consumed when the non-light-emitting, variable transmission devices are in their switching states, not in their static states. In one example, the router 120 may have a power rating of 500 W, and each of the controllers 130, 132, 134, and 136 can have a power rating of 80 W. However, the number of controllers, with power ratings of 80 W each, may exceed the router's power rating of 500 W.

In order to manage this power scheme, the system 100 can utilize the power ratings of the non-light-emitting, variable transmission devices for the sets 160, 162, 164, and 166 and allocate the power to these devices based on what the controllers 130, 132, 134, and 136 will need in order to provide full power to all non-light-emitting, variable transmission devices coupled to the router 120 via the controllers 130, 132, 134, and 136. The power ratings of the non-light-emitting, variable transmission devices of the sets 160, 162, 164, and 166 can be obtained from information that exists in conjunction with the non-light-emitting, variable transmission devices of the sets 160, 162, 164, and 166. For example, this information may be contained within an identification (ID) tag on each non-light-emitting, variable transmission device, within a look-up table provided in conjunction with these devices, information provided by the building management system 110, or an external source. Alternatively, this information can be obtained by an analog method, e.g., a resistance associated with each of these devices.

The allocation of power to the controllers 130, 132, 134, and 136 can be performed as part of a start-up routine after initial configuring or reconfiguring the system 100 or during a reboot of the system 100. The method of operation is described in greater detail below in conjunction with FIG. 5. With respect to a configuration, the system 100 can include a logic element, e.g., within the router 120 that can perform the method steps described below. In particular, the logic element can be configured to determine power requirements for the controllers coupled to the router and allocate power to the controllers corresponding to the power requirements. The power requirements for the controllers 130, 132, 134, and 136 can be obtained by determining the power ratings of the non-light-emitting, variable transmission devices coupled to each of the controllers 130, 132, 134, and 136 and the associated connectors and wiring (e.g., sets of frame cables 152) between the controllers 130, 132, 134, and 136 and their corresponding non-light-emitting, variable transmission devices. Each of the controllers and the router can have a power rating and a sum of the power ratings of the controllers can be greater than the power rating of the router. The system 100 can be configured such that all of the non-light-emitting, variable transmission devices coupled to the controllers can receive full power simultaneously. Moreover, at least two of the controllers 130, 132, 134, and 136 can have different power requirements and different power allocations. Further, at least two of the controllers 130, 132, 134, and 136 can have a same power rating.

In another aspect, for each of the controllers 130, 132, 134, and 136, the power requirement is a sum of power ratings of the non-light-emitting, variable transmission devices within the sets 160, 162, 164, 166. Within the system 100, the power and the control signals for each of the controllers 130, 132, 134, and 136 can be configured to be transmitted over different conductors within the first cable. Specifically, the system 100 can be configured such that the power is transmitted over a first twisted pair of conductors of a cable, and the control signals are transmitted over a second twisted pair of conductors of the same cable. Alternatively, the system 100 can also be configured such that at least part of the power and at least part of the control signals for a controller are transmitted over a same conductor of a cable.

Figure 2:
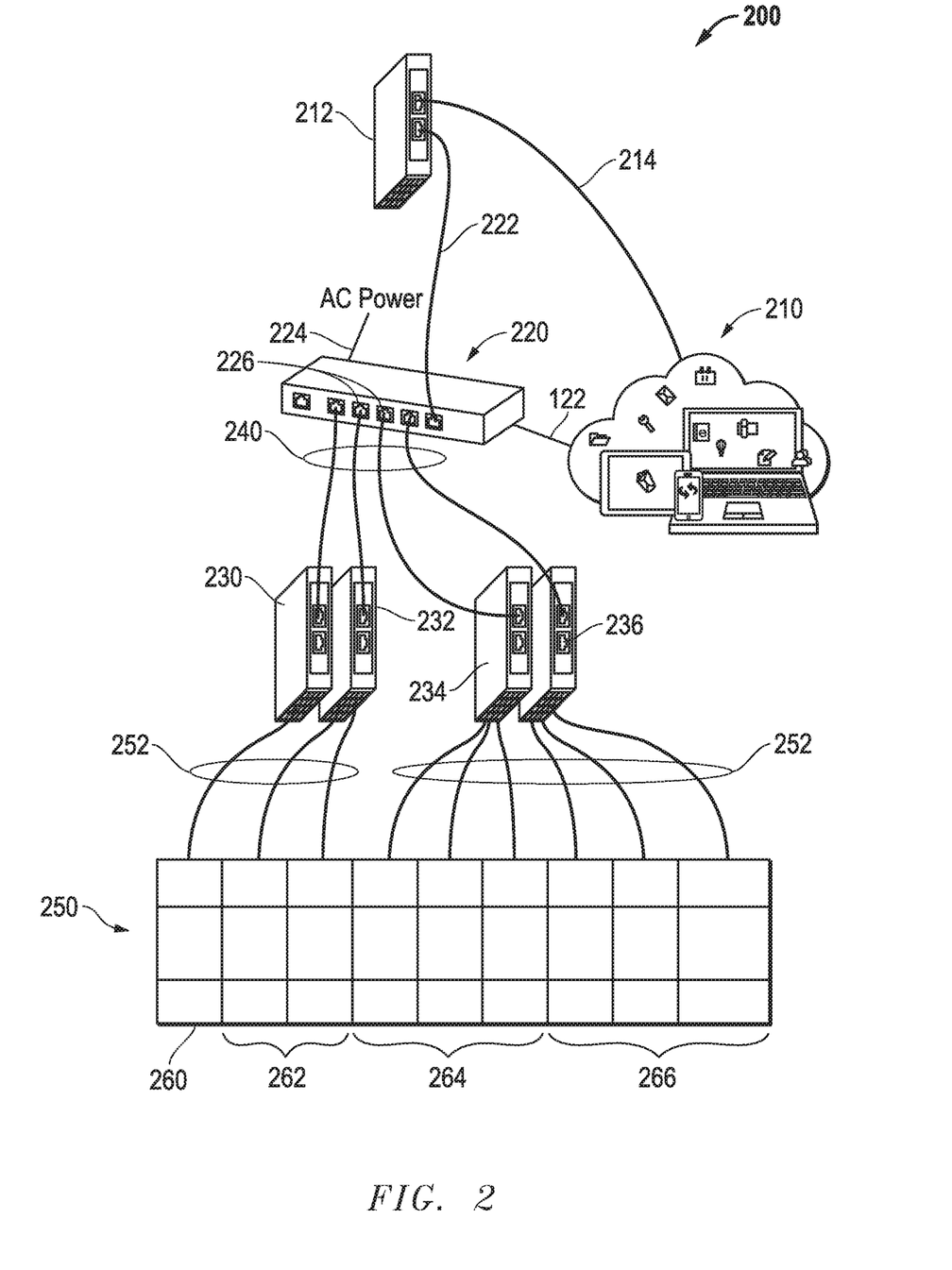
FIG. 2 includes a schematic depiction of a system for controlling a set of non-light-emitting, variable transmission devices in accordance with another embodiment.

In another embodiment, a master-slave configuration of controllers can be used. FIG. 2 is similar to FIG. 1 except that a master controller is between a building management system and a router. In a particular embodiment, a plurality of routers may be coupled to a master controller, and a plurality of master controllers can be coupled to the building management system. Such a configuration can help where the power ratings for all non-light-emitting, variable transmission devices within a building exceed the power rating for a single router. In particular, a router may have a power rating where it can support only a single floor of part of a floor of a building. One or more routers may be used on a remaining portion of the floor or a different floor of the building. The master controller can provide control signals but may not provide power to the routers coupled to the master controller. An exemplary embodiment is described below and illustrated in FIG. 2. After reading this specification, skilled artisans will appreciate that other configurations can be used without deviating from the concepts as described herein.

Referring now to FIG. 2, another system for controlling a set of non-light-emitting, variable transmission devices is illustrated and is generally designated 200. As depicted, the system 200 can include a building management system 210. In a particular aspect, the building management system 210 can include a computing device such as a desk top computer, a laptop computer, a tablet computer, a smartphone, some other computing device, or a combination thereof. The building management system 210 can be used to control the HVAC system of the building, primary lighting, emergency lighting, fire suppression equipment, elevators, escalators, alarms, security cameras, access doors, another suitable component or sub-system of the building, or any combination thereof.

As illustrated in FIG. 2, the system 200 can include a master controller 212 connected to the building management system 210 via a control link 214. Further, a router 220 can be connected to the master controller 212 via a control link 222. The control links 214 and 222 can be wired connections or wireless connections. For example, the wired connection can include a cable such as a Category 3 cable, a Category 5 cable, a Category 5e cable, a Category 6 cable or another suitable cable that can be used in the transmission of power and control signals. In an embodiment, wired connections can comply with the IEEE 802.3 (Ethernet) family of standards. In another embodiment, the control link 222 can use a wireless local area network connection operating according to one or more of the standards within the IEEE 802.11 (WiFi) family of standards. In a particular aspect, the wireless connections can operate within the 2.4 GHz ISM radio band, within the 5.0 GHz ISM radio band, or a combination thereof.

Regardless of the type of control links 214 and 222, the building management system 210 can provide control signals to master controller 212 via the control link 214, and the master controller 212 can provide the control signals to the router 220 via the control link 222. As previously discussed, more than one router may be coupled to the master controller 212. The control signals from the master controller 212 can be used to control the operation of downstream components including the router 220, the controllers 230, 232, 234, and 236, and sets 260, 262, 264, and 266 of non-light-emitting variable transmission devices. As indicated in FIG. 2, the router 220 can be connected to an AC power source 224. The router 220 can include an onboard AC-to-DC converter (not illustrated). The onboard AC-to-DC converter can convert the incoming AC power from the AC power source 224, approximately 120 VAC, to a DC voltage that is at most 60 VDC, 54 VDC, 48 VDC, 24 VDC, at most 12 VDC, at most 6 VDC, or at most 3 VDC.

FIG. 2 also indicates that the router 220 can include a plurality of connectors that can be in the form of female connectors 226. In a particular aspect, the female connectors 226 can include one or more RJ-11 jacks, one or more RJ-14 jacks, one or more RJ-25 jacks, one or more RJ-45 jacks, one or more 8P8C jacks, another suitable jack, or a combination thereof. In another aspect, the female connectors 226 can include one or more USB jacks. In a particular embodiment, the female connectors 226 can be USB-C connectors.

As further illustrated in FIG. 2, the system 200 can include a slave controller 230, a slave controller 232, a slave controller 234, and a slave controller 236 connected to the router 220. The router 220 can be configured to provide power and control signals to the slave controllers 230, 232, 234, and 236 based on the control signals received from the master controller 212. In a particular aspect, the router 220 can include a power inlet port and a control signal port. The router 220 can be configured to receive power via the power inlet port 124 and provide power to any of all of the slave controllers 230, 232, 234, and 236 and receive control signals and provide control signals to any or all of the slave controllers 230, 232, 234, and 236. The onboard AC-to-DC converter within the router 220 can be coupled to the power input port. The router 220 can further include a component that is configured to reduce a voltage of power received over the power input port to voltages of power transmitted over the controller port. The component can include a transformer or a voltage regulator.

Each slave controller 230, 232, 234, or 236 can include a plurality of connectors in the form of female connectors 238. The female connectors 238 on the slave controllers 230, 232, 234, and 236 can include one or more RJ-11 jacks, one or more RJ-14 jacks, one or more RJ-25 jacks, one or more RJ-45 jacks, one or more 8P8C jacks, another suitable jack, or a combination thereof. In another aspect, the female connectors 238 can include one or more USB jacks. In a particular embodiment, the female connectors 238 can be USB-C connectors. In still another aspect, the female connectors on the slave controllers 230, 232, 234, and 236 can be substantially identical to the female connectors 226 of the router 220.

As illustrated in FIG. 2, a plurality of cables 240 can used to connect the slave controllers 230, 232, 234, and 236 to the router 220. Each of the cables 240 can include a Category 3 cable, a Category 5 cable, a Category 5e cable, a Category 6 cable, or another suitable cable. In an embodiment, the plurality of cables 240 can include twisted pair conductors, such as twisted pair wires. In another embodiment, each cable 240 can transmit at least 4 W of power, and in another embodiment, each cable can transmit at most 200 W of power. In another embodiment, each cable 240 can transmit data at a rate of at least 3 Mb/s, and in another embodiment, each cable can transmit data at a rate of at most 100 Gb/s. Each of the cables 240 can include a male connector crimped on, or otherwise affixed to, the distal and proximal ends of each of the cables 240. Also, each male connector can include an RJ-11 plug, an RJ-14 plug, an RJ-25 plug, an RJ-45 plug, an 8P8C plug, or a combination thereof. In another aspect, the male connectors can include one or more USB plugs. In a particular embodiment, the male connectors can be USB-C connectors. In an embodiment, the male and female connectors at each connection can be complementary connectors. The male/female connections allow components, such as the slave controllers 230, 232, 234, and 236, to be quickly and easily disconnected from the system 200 and replaced. Further, the male/female connections can allow the router 220 to be easily disconnected from the system 200 and replaced. While the system 200 of FIG. 2 is illustrated with four slave controllers 230, 232, 234, and 236, the system 200 may include more or fewer slave controllers.

Still referring to FIG. 2, the system 200 can also include a window frame panel 250 can include a plurality of non-light-emitting, variable transmission devices, each of which may connected to its corresponding controller via its own frame cable. In the embodiment as illustrated, the non-light-emitting, variable transmission devices can be electrically connected to the controllers 230, 232, 234, and 236 via a plurality of sets of frame cables 252. The window frame panel 250 can have any of the number and orientations of non-light-emitting, variable transmission devices and glazings as previously described with respect to the window frame panel 150.

In a particular, non-limiting embodiment, the window frame panel 250 can include a set 260 of non-light-emitting, variable transmission devices coupled to the first controller 230 via a set of frame cables 252. The window frame panel 250 can also include a set 262 of non-light-emitting, variable transmission devices connected to the second controller 232 via sets of frame cables 252. Moreover, the window frame panel 250 can include a set 264 of non-light-emitting, variable transmission devices connected to the third controller 234 via other sets of frame cables 252, and a set 266 of non-light-emitting, variable transmission devices connected to the fourth controller 236 via further sets of frame cables 252. While the system 200 of FIG. 2 is illustrated with the sets 260, 262, 264, and 266, the system 200 may include more or fewer sets of non-light-emitting, variable transmission devices.

In an alternative embodiment, the frame cables 252 may have male or female connectors on only one end of the cables or may have no male or female connectors on either end of the cable. For example and referring to FIG. 4, the bus bars 344 and 348 may have wired connected at solder tabs. These wires may be connected to its corresponding controller without any male or female connector. Alternatively, the wires may be connected to a male/female connector. After reading this specification, skilled artisans will appreciate that not all connectors within the system need to be male or female connectors.

The slave controllers 230, 232, 234, and 236 can provide power to the sets 260, 262, 264, and 266 of non-light-emitting, variable transmission devices connected thereto via the frame cables 252. The power provided to the non-light-emitting, variable transmission devices within the sets 260, 262, 264, and 266 can have a voltage that is at most 12 V, at most 6 V, or at most 3 V. The slave controllers 230, 232, 234, and 236 can be used to control operation of the non-light-emitting, variable transmission devices within the sets 260, 262, 264, and 266. During operation, the non-light-emitting, variable transmission devices within the sets 260, 262, 264, and 266 act similar to capacitors. Most of the power is consumed when the non-light-emitting, variable transmission devices are in their switching states, not in their static states. In one example, the router 220 may have a power rating of 500 W, and each of the controllers 230, 232, 234, and 236 can have a power rating of 80 W. However, the number of controllers, with power ratings of 80 W each, may exceed the router's power rating of 500 W.

In order to manage this power scheme, the system 200 can utilize the power ratings of the non-light-emitting, variable transmission devices for the sets 260, 262, 264, and 266 and allocate the power to these devices based on what the slave controllers 230, 232, 234, and 236 will need in order to provide full power to all non-light-emitting, variable transmission devices coupled to the router 220 via the controllers 230, 232, 234, and 236. The power ratings of the non-light-emitting, variable transmission devices of the sets 260, 262, 264, and 266 can be obtained from information that exists in conjunction with the non-light-emitting, variable transmission devices of the sets 260, 262, 264, and 266. For example, this information may be contained within an ID tag on each non-light-emitting, variable transmission devices, within a look-up table provided in conjunction with these devices, information provided by the building management system 210, or an external source. Alternatively, this information can be obtained by an analog method, e.g., a resistance associated with each of these devices.

The allocation of power to the controllers 230, 232, 234, and 236 can be performed as part of a start-up routine after initial configuring or reconfiguring the system 200 or during a reboot of the system 200. With respect to a configuration, the system 200 can include a logic element, e.g., within the router 220 that can perform the method steps described below. In particular, the logic element can be configured to determine power requirements for the controllers coupled to the router and allocate power to the controllers corresponding to the power requirements. The power requirements for the controllers 230, 232, 234, and 236 can be obtained by determining the power ratings of the non-light-emitting, variable transmission devices coupled to each of the controllers 230, 232, 234, and 236. Each of the controllers and the router can have a power rating and a sum of the power ratings of the controllers can be greater than the power rating of the router. The system 200 can be configured such that all of the non-light-emitting, variable transmission devices coupled to the controllers can receive full power simultaneously. Moreover, at least two of the controllers 230, 232, 234, and 236 can have different power requirements and different power allocations. Further, at least two of the controllers 230, 232, 234, and 236 can have a same power rating.

In another aspect, for each of the controllers 230, 232, 234, and 236, the power requirement is a sum of power ratings of the non-light-emitting, variable transmission devices within the sets 260, 262, 264, and 266. Within the system 200, the power and the control signals for each of the controllers 230, 232, 234, and 236 can be configured to be transmitted over different conductors within the first cable. Specifically, the system 200 can be configured such that the power is transmitted over a first twisted pair of conductors of a cable, and the control signals are transmitted over a second twisted pair of conductors of the same cable. Alternatively the system 200 can also be configured such that at least part of the power and at least part of the control signals for a controller are transmitted over a same conductor of a cable.

Figure 3:
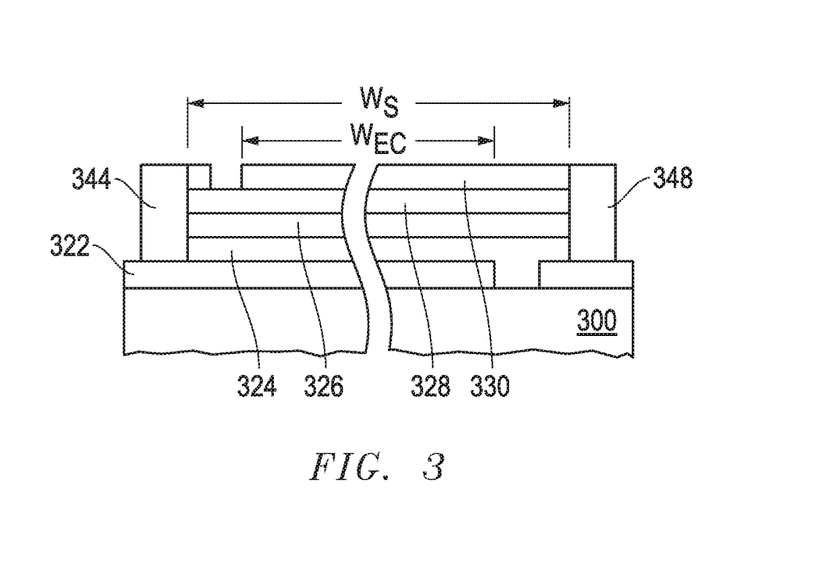
FIG. 3 includes an illustration of a cross-sectional view of a portion of a substrate, a stack of layers for a non-light-emitting variable transmission device, and bus bars.
Figure 4:
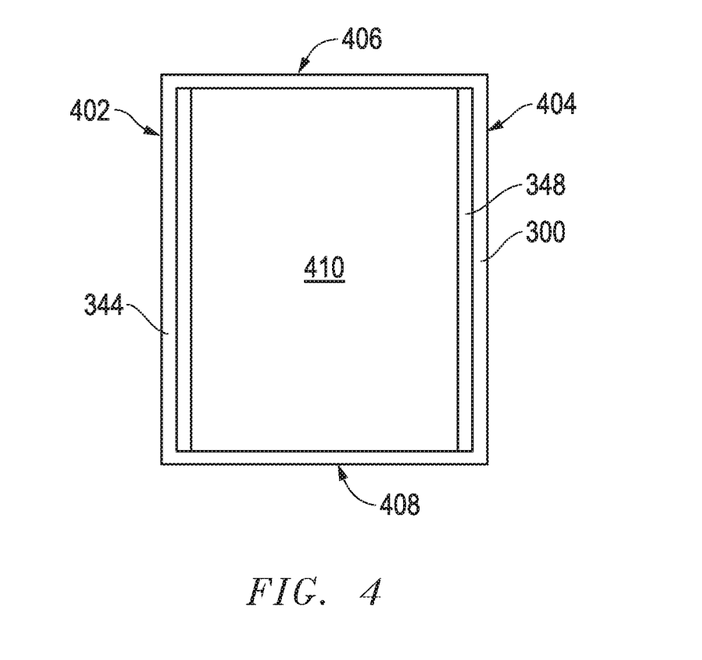
FIG. 4 includes an illustration of a top view of the substrate, the stack of layers, and the bus bars.

The system can be used with a wide variety of different types of non-light-emitting variable transmission devices. The description with respect to FIGS. 3 and 4 provide exemplary embodiments of a glazing that includes a glass substrate and a non-light-emitting variable transmission device disposed thereon. The embodiment as described with respect to FIGS. 3 and 4 is not meant to limit the scope of the concepts as described herein. In the description below, a non-light-emitting variable transmission device will be described as operating with voltages on bus bars being in a range of 0 V to 3 V. Such description is used to simplify concepts as described herein. Other voltage may be used with the non-light-emitting variable transmission device or if the composition or thicknesses of layers within an electrochromic stack are changed. The voltages on bus bars may both be positive (1 V to 4 V), both negative (−5 V to −2 V), or a combination of negative and positive voltages (−1 V to 2 V), as the voltage difference between bus bars are more important than the actual voltages. Furthermore, the voltage difference between the bus bars may be less than or greater than 3 V. After reading this specification, skilled artisans will be able to determine voltage differences for different operating modes to meet the needs or desires for a particular application. The embodiments are exemplary and not intended to limit the scope of the appended claims.

FIG. 3 includes a cross-sectional view of a portion of substrate 300, a stack of layers 322, 324, 326, 328, and 330, and bus bars 344 and 348 overlying the substrate 300. In an embodiment, the substrate 300 can include a glass substrate, a sapphire substrate, an aluminum oxynitride substrate, or a spinel substrate. In another embodiment, the substrate 300 can include a transparent polymer, such as a polyacrylic compound, a polyalkene, a polycarbonate, a polyester, a polyether, a polyethylene, a polyimide, a polysulfone, a polysulfide, a polyurethane, a polyvinylacetate, another suitable transparent polymer, or a co-polymer of the foregoing. The substrate 300 may or may not be flexible. In a particular embodiment, the substrate 300 can be float glass or a borosilicate glass and have a thickness in a range of 0.5 mm to 4 mm thick. In another particular embodiment, the substrate 300 can include ultra-thin glass that is a mineral glass having a thickness in a range of 50 microns to 300 microns. In a particular embodiment, the substrate 300 may be used for many different non-light-emitting variable transmission devices being formed and may referred to as a motherboard.

The compositions and thicknesses of the layers are described before describing their formation. Transparent conductive layers 322 and 330 can include a conductive metal oxide or a conductive polymer. Examples can include a tin oxide or a zinc oxide, either of which can be doped with a trivalent element, such as Al, Ga, In, or the like, a fluorinated tin oxide, or a sulfonated polymer, such as polyaniline, polypyrrole, poly(3,4-ethylenedioxythiophene), or the like. In another embodiment, the transparent conductive layers 322 and 330 can include gold, silver, copper, nickel, aluminum, or any combination thereof. The transparent conductive layers 322 and 330 can have the same or different compositions.

The set of layers further includes an electrochromic stack that includes the layers 324, 326, and 328 that are disposed between the transparent conductive layers 322 and 330. The layers 324 and 328 are electrode layers, wherein one of the layers is an electrochromic layer, and the other of the layers is an ion storage layer (also referred to as a counter electrode layer). The electrochromic layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, or any combination thereof and have a thickness in a range of 50 nm to 2000 nm. The ion storage layer can include any of the materials listed with respect to the electrochromic layer or $Ta_2O_5$, $ZrO_2$, $HfO_2$, $Sb_2O_3$, or any combination thereof, and may further include nickel oxide (NiO, $Ni_2O_3$, or combination of the two), and Li, Na, H, or another ion and have a thickness in a range of 80 nm to 500 nm. An ion conductive layer 326 (also referred to as an electrolyte layer) is disposed between the electrode layers 324 and 328, and has a thickness in a range of 20 microns to 60 microns. The ion conductive layer 326 allows ions to migrate therethrough and does not allow a significant number of electrons to pass therethrough. The ion conductive layer 326 can include a silicate with or without lithium, aluminum, zirconium, phosphorus, boron; a borate with or without lithium; a tantalum oxide with or without lithium; a lanthanide-based material with or without lithium; another lithium-based ceramic material; or the like. The ion conductive layer 326 is optional and, when present, may be formed by deposition or, after depositing the other layers, reacting portions of two different layers, such as the electrode layers 324 and 328, to form the ion conductive layer 326. After reading this specification, skilled artisans will appreciate that other compositions and thicknesses for the layers 322, 324, 326, 328, and 330 can be used without departing from the scope of the concepts described herein.

The layers 322, 324, 326, 328, and 330 can be formed over the substrate 300 with or without any intervening patterning steps, breaking vacuum, or exposing an intermediate layer to air before all the layers are formed. In an embodiment, the layers 322, 324, 326, 328, and 330 can be serially deposited. The layers 322, 324, 326, 328, and 330 may be formed using physical vapor deposition or chemical vapor deposition. In a particular embodiment, the layers 322, 324, 326, 328, and 330 are sputter deposited.

In the embodiment illustrated in FIG. 3, each of the transparent conductive layers 322 and 330 include portions removed, so that the bus bars 344 and 348 are not electrically connected to each other. Such removed portions are typically 20 nm to 2000 nm wide. In a particular embodiment, the bus bar 344 is electrically connected to the electrode layer 324 via the transparent conductive layer 322, and the bus bar 348 is electrically connected to the electrode layer 348 via the transparent conductive layer 330. The bus bars 344 and 348 include a conductive material. In an embodiment, each of the bus bars 344 and 348 can be formed using a conductive ink, such as a silver frit, that is printed over the transparent conductive layer 322. In another embodiment, one or both of the bus bars 344 and 348 can include a metal-filled polymer. In a particular embodiment (not illustrated), the bus bar 348 is a non-penetrating bus bar that can include the metal-filled polymer that is over the transparent conductive layer 330 and spaced apart from the layers 322, 324, 326, and 328. The viscosity of the precursor for the metal-filled polymer may be sufficiently high enough to keep the precursor from flowing through cracks or other microscopic defects in the underlying layers that might be otherwise problematic for the conductive ink. The lower transparent conductive layer 322 does not need to be patterned in this particular embodiment.

In the embodiment illustrated, the width of the non-light-emitting variable transmission device $W_{EC}$ is a dimension that corresponds to the lateral distance between the removed portions of the transparent conductive layers 322 and 330. $W_S$ is the width of the stack between the bus bars 344 and 348. The difference in $W_S$ and $W_{EC}$ is at most 5 cm, at most 2 cm, or at most 0.9 cm. Thus, most of the width of the stack corresponds to the operational part of the non-light-emitting variable transmission device that allows for different transmission states. In an embodiment, such operational part is the main body of the non-light-emitting variable transmission device and can occupy at least 90%, at least 95%, at least 98% or more of the area between the bus bars 344 and 348.

FIG. 4 includes a top view of the substrate 300 and a non-light-emitting variable transmission device 410 that includes the layers as described with respect to FIG. 3. The bus bar 344 lies along a side 402 of the substrate 300, and the bus bar 348 lies along a side 404 that is opposite the side 402. Each of the bus bars 344 and 348 have lengths that extend a majority of the distance between a side 406 and a side 408 that is opposite the side 406. In a particular embodiment, each of the bus bars 344 and 348 have a length that is at least 75%, at least 90%, or at least 95% of the distance between the sides 406 and 408. The lengths of the bus bars 344 and 348 are substantially parallel to each other. As used herein, substantially parallel is intended to means that the lengths of the bus bars 344 and 348 are within 10 degrees of being parallel to each other. Along the length, each of the bus bars has a substantially uniform cross-sectional area and composition. Thus, in such an embodiment, the bus bars 344 and 348 have a substantially constant resistance per unit length along their respective lengths.

Attention is now addressed to installing, configuring, and using the system as illustrated in FIG. 1 with glazings and non-light-emitting, variable transmission devices that can be similar to the glazing and non-light-emitting, variable transmission device as illustrated and described with respect to FIGS. 3 and 4. In another embodiment, other designs of glazings and non-light-emitting, variable transmission devices.

Figure 5:
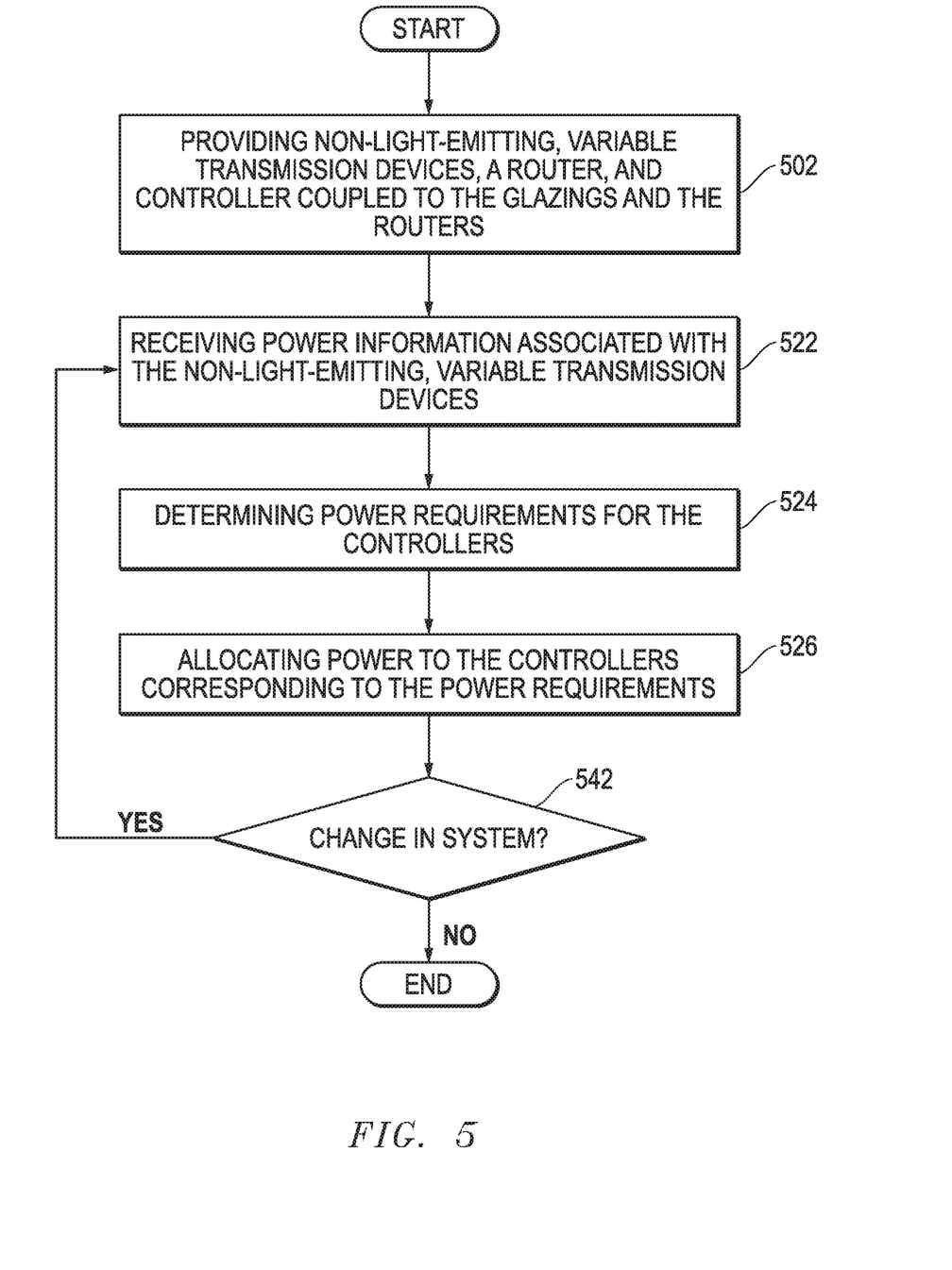
FIG. 5 includes a flow diagram for operating the system of FIG. 1 or 2.

FIG. 5 includes flow chart for a method of operating the system 100 illustrated in FIG. 1. The method of operating the system 200 of FIG. 2 will be similar. Commencing at block 502, the method can include providing one or more non-light-emitting, variable transmission devices, one or more routers, and one or more controllers coupled to the one or more glazings and the one or more routers. In an embodiment, the non-light-emitting, variable transmission devices, routers, and controllers may be connected to each other as illustrated in FIG. 1 and use non-light-emitting variable transmission devices similar to the non-light-emitting variable transmission device described and illustrated in FIGS. 3 and 4. Moreover, to facilitate installation and connection, female connectors and male connectors as described herein, can be used to connect the routers to the controllers. Also, male or female connectors may be used to connect the non-light-transmitting, variable transmission devices to the controllers. The male/female connections makes it relatively simple to remove and replace particular components if they fail, are damaged, or otherwise need to be replaced. Further, the male/female connections facilitate the initial installation and subsequent reconfiguration of the systems.

Continuing the description of the method 500, at block 522, the method can include receiving power information associated with the non-light emitting, variable transmission devices of the glazing. This power information can be received at the router 120. This information may be contained within an ID tag on each device, a look-up table provided in conjunction with these devices, information provided by the building management system 110, or an external source. Alternatively, this information can be obtained by an analog method, e.g., a resistance associated with each of these devices. This information can be manually input into a building management system, and the building management system 110 can push this information to the router 120 while the system 100 is being initially configured, reconfigured, or during a system reboot.

At block 524, the method can include determining the power requirements for the controllers. This determination can be made based on the power information received at block 522, above. Specifically, determining the power requirements can include receiving power information associated with the non-light-emitting, variable transmission devices located in glazings as illustrated in FIG. 1. The information can include the power ratings of the non-light-emitting variable transmission devices coupled to the controllers. From the perspective of each controller, the power requirement for the controller can be the sum of the power ratings of non-light-emitting variable transmission device coupled to that particular controller. In another aspect, determining the power requirements can include analyzing signals to determine an electrical property of the non-light-emitting, variable transmission devices located in certain glazings. In another embodiment, some power may be allocated to the controllers as some power will be lost as it passes through the controllers, and the controllers may perform some operations (e.g., determining power requirements of downstream non-light-emitting, variable transmission devices, determining voltages to be applied to the non-light-emitting, variable transmission devices, or the like). For example, 1 W may be allocated for power lost at each controller.

Moving to block 526, the method can include allocating power to the controllers corresponding to the power requirements determined at step 524. The allocation can be tailored to the power requirements for each of the controllers. For example, each controller may have a power rating of 80 W, and the router may have a power rating of 500 W and have eight of the 80-W controllers coupled to it. Based on the power ratings, the product of the number of controllers and their power ratings (8×80 W=640 W) is greater than the power rating of the router. However, the controllers may have power requirements of 10 W, 20 W, 80 W, 80 W, and the remainder at 40 W. Thus, the router only needs to provide 350 W for the non-light-emitting, variable transmission devices, even when all non-light-emitting variable transmission devices are receiving maximum power, based on the power ratings of the non-light-emitting variable transmission devices. Thus, the allocation of power is based on power required by the controllers to control the downstream non-light-emitting variable transmission devices, not the power ratings of the controllers. In this manner, all non-light-emitting variable transmission devices can be operated at full power if needed or desired.

Moving to decision 542, the method can include determining whether there has been a change to the system. A change to the system can include the addition of another glazing with a non-light emitting, variable transmission device, the removal of a glazing with a non-light emitting, variable transmission device, or the replacement of a particular glazing with a non-light emitting, variable transmission device with a glazing with a non-light emitting, variable transmission device having different power requirements.

The change can include adding, removing or replacing a controller or router. The change can further include a reconfiguration of non-light-emitting variable transmission devices coupled to any one or more controllers. For example, the controller 136 may be changed to have two columns of non-light-emitting variable transmission devices coupled to the controller, and the controller 136 can be changed to have two columns of non-light-emitting variable transmission device coupled to it. The change can include switching from the configuration of FIG. 1 to FIG. 2, or vice versa.

The method described above may be performed when the system 100 of FIG. 1 is commissioned or re-commissioned. Commissioning can occur when the system 100 is initially installed an energized for the first time. Re-commissioning can occur after a reconfiguration, a power interruption or after the system 100 is reset. The commissioning or re-commissioning sequence according to the method can precede normal operation of the systems 100, 200 that include the routers, the controllers, and the glazings that include the non-light-emitting, variable transmission devices. Thus, change of the system should be construed broadly.

At decision 542, if there is a change to the system, the method can return to block 522 and the method can continue as described above. Conversely, at decision 542, if there is not a change to the system, the method can end.

Embodiments as described above can provide benefits over other systems with non-light-emitting, variable transmission devices. The use of male/female connections can help with quick and easy replacement of, adding, or removing a component within the system. A controller or router may be replaced without any tools. A comparative system may require a screwdriver, a solder gun, electrical tape or the like. Further, the male/female connections save significantly on the time need to change the configuration. Individual wires do not need to be traced for the entire signal path to the non-light-emitting, variable transmission devices. The likelihood of incorrect wiring is significantly reduced.

The system can be configured to allocate of power to controllers during of any initial commissioning of the system or any subsequent re-commissioning. The system allows all non-light-emitting, variable transmission devices coupled to a router to receive full power at the same time, even when the sum of the power ratings of the controllers exceed the power rating of their corresponding router.

A comparative technique may include providing power only to the controllers, as long as the sum of the power ratings of the controllers coupled to a router does not exceed the power rating of the router. Using the previously described example with eight controllers, the router may only provide power to six of the eight controllers because eight controllers (8×80 W, 640 W) exceed the power rating of the router (500 W). Thus, non-light-emitting, variable transmission devices coupled to two of the controllers may not receive any power. Thus, some of the non-light-emitting, variable transmission devices will not be operated.

Another comparative technique may allocate a proportional amount of power to the controllers. Using the same eight controller configuration, each controller may receive power corresponding to the power rating of the controller times the power rating of the router divided by the sum of the power ratings of the controllers coupled to the router. Using an equation, the power allocated to the controller is:

$$80\ W \times (500\ W / 640\ W) = 62.5\ W,$$

where 80 W corresponds to the power rating of a controller, 500 W corresponds to the power rating of the router, and 640 W corresponds to the sum of the power ratings of the controllers coupled to the router. The two controllers having power requirements of 80 W will not be able to operate at full power. Thus, the non-light-emitting, variable transmission devices coupled to such two controllers will take longer to change states, as compared to the non-light-emitting, variable transmission devices coupled to the other six controllers.

The methods as described herein allow all non-light-emitting, variable transmission devices coupled to receive full power simultaneously. Each of the comparative techniques does not provide such control over the non-light-emitting, variable transmission devices. Non-light-emitting, variable transmission devices may not be operated because no power is allocated to their corresponding controllers, or controllers having relatively higher power requirements may receive only a fraction of the power they need and result in different switching rates for non-light-emitting, variable transmission devices.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1

A system comprising: a first non-light-emitting, variable transmission device; a first controller coupled and configured to provide power to the first non-light-emitting, variable transmission device, wherein the first controller includes a first connector; a router configured to provide power and control signals to the first controller, wherein the router includes a second connector; and a first cable including a third connector and a fourth connector at different ends of the first cable, wherein: the first and third connectors are coupled to each other, the first connector is a male or a female connector, and the third connector is the other of a male or a female connector; and the second and fourth connectors are coupled to each other, the second connector is a male or a female connector, and the fourth connector is the other of a male or a female connector.

Embodiment 2

The system of Embodiment 1, further comprising a second cable, wherein: the first non-light-emitting, variable transmission device further includes a fifth connector; the first controller further includes a sixth connector; and the second cable includes a seventh connector and an eighth connector at different ends of the second cable, wherein: the fifth and seventh connectors are coupled to each other, the fifth connector is a male or a female connector, and the seventh connector is the other of a male or a female connector; and the sixth and eighth connectors are coupled to each other, the sixth connector is a male or a female connector, and the eighth connector is the other of a male or a female connector.

Embodiment 3

A system comprising: glazings including variable transmission devices; controllers coupled to the glazings and configured to provide power to the variable transmission devices; a router coupled to the controllers, wherein the router is configured to provide power and control signals to the controllers; and a logic element configured to: determine power requirements for the controllers coupled to the router; and allocate power to the controllers corresponding to the power requirements.

Embodiment 4

A method of controlling a system comprising: providing the system including a first non-light-emitting, variable transmission device, a first controller, a router, and a first cable, wherein: the first controller is coupled to the first non-light-emitting, variable transmission device and includes a first connector; the router includes a second connector; and the first cable includes a third connector and a fourth connector at different ends of the first cable, wherein: the first and third connectors are coupled to each other, the first connector is a male or a female connector, and the third connector is the other of a male or a female connector; and the second and fourth connectors are coupled to each other, the second connector is a male or a female connector, and the fourth connector is the other of a male or a female connector; transmitting control signals and power from the router to the first controller via the first cable; and transmitting at least part of the power from the first controller to the first non-light-emitting, variable transmission device.

Embodiment 5

The method of Embodiment 4, wherein providing the system comprises providing the system including: non-light-emitting, variable transmission device, including the first non-light-emitting, variable transmission device; and controllers, including the first controller, wherein each controller is coupled to (1) the router and (2) at least one of the non-light-emitting, variable transmission device.

Embodiment 6

The method of Embodiment 5, further comprising determining power requirements for the controllers; and allocating power to the controllers corresponding to the power requirements.

Embodiment 7

A method of controlling variable transmission devices comprising: determining power requirements for controllers coupled to a router, wherein: glazings include variable transmission devices; the controllers are coupled to the glazings and configured to provide power to the variable transmission devices; and the router is coupled to the controllers, wherein the router is configured to provide power and control signals to the controllers; and allocating power to the controllers corresponding to the power requirements.

Embodiment 8

The method of Embodiment 6 or 7, wherein determining the power requirements and allocating power is performed during a commissioning or re-commissioning sequence.

Embodiment 9

The method of Embodiment 8, wherein the commissioning or re-commissioning sequence precedes a normal operation of a system including the router, the controllers, and the non-light-emitting, variable transmission devices.

Embodiment 10

The method of any one of Embodiments 5 to 9, wherein determining the power requirements comprises: receiving power information associated with the non-light-emitting, variable transmission devices; analyzing signals to determine an electrical property of the non-light-emitting, variable transmission devices; or receiving the power information associated with at least one of the non-light-emitting, variable transmission devices, and analyzing signals to determine an electrical property of another non-light-emitting, variable transmission devices.

Embodiment 11

The system or the method of any one of Embodiments 1 to 10, wherein any of the first, second, third, and fourth connectors is an Ethernet connector or a universal serial bus connector.

Embodiment 12

The system of any one of Embodiments 1 to 3, wherein the system includes: non-light-emitting, variable transmission device, including the first non-light-emitting, variable transmission device; and controllers, including the first controller, and configured to provide power to at least one of the non-light emitting variable transmission device, wherein each controller is coupled to (1) the router and (2) at least one of the non-light-emitting, variable transmission devices, wherein the router is configured to provide power and control signals to the controllers.

Embodiment 13

The system or the method of any one of Embodiments 5 to 10 and 12, wherein the system further comprises a logic element configured to: determine power requirements for the controllers coupled to the router; and allocate power to the controllers corresponding to the power requirements.

Embodiment 14

The system or the method of any one of Embodiments 5 to 10, 12 and 13, wherein each of the controllers and the router has a maximum power rating, and a sum of the maximum power ratings of the controllers is greater than the maximum power rating of the router.

Embodiment 15

The system or the method of Embodiment 14, wherein the system is configured such that all of the variable transmission devices coupled to the controllers can receive full power simultaneously.

Embodiment 16

The system or the method of any one of Embodiments 5 to 10 and 12 to 15, wherein at least two controllers of the controllers have different power requirements, and the at least two controllers have different power allocations.

Embodiment 17

The system or the method of Embodiment 16, wherein the at least two controllers have a same maximum power rating.

Embodiment 18

The system or the method of any one of Embodiments 5 to 10 and 12 to 17, wherein for each controller, the power requirement is a sum of maximum power ratings of the variable transmission devices coupled to the each controller.

Embodiment 19

The system or the method of any one of Embodiments 1 to 18, wherein the power and the control signals for the first controller are configured to be transmitted over different conductors within the first cable.

Embodiment 20

The system or the method of any one of Embodiments 1 to 19, wherein the system is configured such that the power is transmitted over a first twisted pair of conductors of the first cable, and the control signals are transmitted over a second twisted pair of conductors of the first cable.

Embodiment 21

The system or the method of any one of Embodiments 1 to 19, wherein the system is configured such that at least part of the power and at least part of the control signals for the first controller are transmitted over a same conductor of the first cable.

Embodiment 22

The system or the method of any one of Embodiments 1 to 21, wherein the router further includes a power input port and a control signal port, and the router is configured to receive power via and power input port and provide power to the first controller; and receive control signals and provide control signals to the first controller.

Embodiment 23

The system or the method of Embodiment 22, wherein the router further comprises an alternating current-to-direct current converter coupled to the power input port.

Embodiment 24

The system or the method of Embodiment 22 or 23, wherein the router further comprises a component configured to reduce a voltage of power received over the power input port to voltages of power transmitted over the controller port.

Embodiment 25

The system or the method of Embodiment 24, wherein the component is a transformer or a voltage regulator.

Embodiment 26

The system or the method of any one of Embodiments 22 to 25, further comprising a building management system coupled to the router via the control signal port.

Embodiment 27

The system or the method of any one of Embodiments 5 to 10 and 12 to 26, wherein the controllers include a master controller and a slave controller; and the router coupled between the master controller and the slave controller.

Embodiment 28

The system or the method of any one of the preceding Embodiments, wherein the first cable is configured to transmit at least 4 W of power.

Embodiment 29

The system or the method of any one of the preceding Embodiments, wherein the first cable is configured to transmit at most 200 W of power.

Embodiment 30

The system or the method of any one of the preceding Embodiments, wherein the first cable is configured to support a data rate of at least 3 Mb/s.

Embodiment 31

The system or the method of any one of the preceding Embodiments, wherein the first cable is configured to support a data rate of most 100 Gb/s.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A system comprising:
    non-light-emitting, variable transmission devices, including a first non-light-emitting, variable transmission device;
    controllers, including a first controller, coupled and configured to provide power to at least one of the first non-light-emitting, variable transmission device, wherein the first controller includes a first connector;
    a router configured to provide power and control signals to the first controllers, wherein the router includes a second connector, wherein each controller is coupled to (1) the router and (2) at least one of the non-light-emitting, variable transmission devices;
    a logic element configured to:
        determine power requirements for the controllers coupled to the router; and
        allocate power to the controllers corresponding to the power requirements; and
    a first cable including a third connector and a fourth connector at different ends of the first cable,
    wherein:
        the first and third connectors are coupled to each other, the first connector is a male or a female connector, and the third connector is the other of a male or a female connector; and
        the second and fourth connectors are coupled to each other, the second connector is a male or a female connector, and the fourth connector is the other of a male or a female connector
        wherein each of the controllers and the router has a maximum power rating, and a sum of the maximum power ratings of the controllers is a greater than the maximum power rating of the router.

2. The system of claim 1, further comprising a second cable, wherein:
    the first non-light-emitting, variable transmission device further includes a fifth connector;
    the first controller further includes a sixth connector; and
    the second cable includes a seventh connector and an eighth connector at different ends of the second cable, wherein:
        the fifth and seventh connectors are coupled to each other, the fifth connector is a male or a female connector, and the seventh connector is the other of a male or a female connector; and
        the sixth and eighth connectors are coupled to each other, the sixth connector is a male or a female connector, and the eighth connector is the other of a male or a female connector.

3. The system of claim 1, wherein any of the first, second, third, and fourth connectors is an Ethernet connector or a universal serial bus connector.

4. The system of claim 1, wherein the system is configured such that all of the variable transmission devices coupled to the controllers can receive full power simultaneously.

5. The system of claim 1, wherein at least two controllers of the controllers have different power requirements, and the at least two controllers have different power allocations.

6. The system of claim 5, wherein the at least two controllers have a same maximum power rating.

7. The system of claim 1, wherein the router further includes a power input port and a control signal port, and the router is configured to:
    receive power via a power input port and provide power to the first controller; and
    receive control signals and provide control signals to the first controller.

8. The system of claim 7, further comprising a building management system coupled to the router via the control signal port.

9. The system of claim 1, wherein the first cable is configured to transmit at least 4 W of power.

10. The system of claim 1, wherein the first cable is configured to support a data rate of at least 3 Mb/s.

11. The system of claim 1, wherein for each controller, the power requirement is a sum of maximum power ratings of the variable transmission devices coupled to the each controller.

12. The system of claim 1, wherein the power and the control signals for the first controller are configured to be transmitted over different conductors within the first cable.

13. The system of claim 1, wherein the system is configured such that the power is transmitted over a first twisted pair of conductors of the first cable, and the control signals are transmitted over a second twisted pair of conductors of the first cable.

14. The system of claim 1, wherein the first cable is configured to transmit at most 200 W of power.

15. The system of claim 1, wherein the first cable is configured to support a data rate of most 100 Gb/s.

* * * * *

UNITED STATES PATENT AND TRADEMARK OFFICE
CERTIFICATE OF CORRECTION

PATENT NO. : 11,330,060 B2
APPLICATION NO. : 16/127777
DATED : May 10, 2022
INVENTOR(S) : Bryan D. Greer et al.

It is certified that error appears in the above-identified patent and that said Letters Patent is hereby corrected as shown below:

In the Claims

In Column 21, Line 31, please delete "to the first controllers,", and insert --to the controllers,--

In Column 21, Line 53, please delete "of the controllers is a greater", and insert --of the controllers is greater--

Signed and Sealed this
Fourteenth Day of May, 2024

Katherine Kelly Vidal
*Director of the United States Patent and Trademark Office*